United States Patent [19]

Blum et al.

[11] 4,207,222
[45] Jun. 10, 1980

[54] AQUEOUS COATING AGENTS, IMPREGNATING AGENTS AND ADHESIVES

[75] Inventors: Rainer Blum, Ludwigshafen; Matthias Marx, Bad Duerkheim, both of Fed. Rep. of Germany

[73] Assignee: BASF Aktiengesellschaft, Fed. Rep. of Germany

[21] Appl. No.: 820,774

[22] Filed: Aug. 1, 1977

[30] Foreign Application Priority Data

Aug. 16, 1976 [DE] Fed. Rep. of Germany ....... 2636797

[51] Int. Cl.² .............................................. C08L 61/10
[52] U.S. Cl. ............................... 260/29.3; 204/181 C; 260/29.2 TN; 260/29.2 EP; 260/29.2 N; 260/29.2 UA; 260/29.4 UA; 260/29.7 T; 260/29.7 NR; 428/512
[58] Field of Search ............... 260/29.7 NR, 29.6 NR, 260/29.6 XA, 29.3 R, 29.4 UA, 29.2 TN, 845, 846; 204/181 C

[56] References Cited

U.S. PATENT DOCUMENTS

| | | | |
|---|---|---|---|
| 3,658,795 | 4/1972 | Daimer | 260/29.3 |
| 3,689,446 | 12/1972 | Furuya et al. | 260/29.7 R |
| 3,853,801 | 12/1974 | Tominaga et al. | 260/29.3 |
| 3,941,736 | 3/1976 | Aldrich | 260/29.6 NR |
| 3,994,989 | 11/1976 | Kempter | 260/831 |
| 4,001,155 | 1/1977 | Kempter et al. | 260/29.2 EP |

*Primary Examiner*—Theodore E. Pertilla
*Attorney, Agent, or Firm*—Keil & Witherspoon

[57] ABSTRACT

The invention relates to aqueous coating agents, impregnating agents and adhesives in which the binder is a mixture of from 20 to 97% by weight of a cationic water-dispersible resin and from 3 to 80% by weight of a hydrocarbon resin, and/or a modified hydrocarbon resin, which per se is not water-dispersible. The coating agents, impregnating agents and adhesives may in particular be used for the cathodic electrocoating of metallic articles.

9 Claims, No Drawings

AQUEOUS COATING AGENTS, IMPREGNATING AGENTS AND ADHESIVES

The present invention relates to aqueous coating agents, impregnating agents and adhesives which contain, as the binder, a mixture of a cationic resin and a hydrocarbon resin, and to their use for cathodic electrocoating.

Cationic binders have numerous potential applications as adhesives and impregnating agents, since on certain substrates, e.g. paper fibers, they are absorbed more rapidly from a dilute liquor than are anionic or neutral binders.

In surface coating technology, cationic binders have, with the introduction of cathodic electrocoating, aroused increased interest since they provide improved corrosion protection, above all on non-phosphatized types of tinplate.

The fact that cationic binders are as yet employed to a relatively small extent in practice is above all attributable to the high curing temperatures required to convert them to solvent-resistant end products.

It is an object of the present invention to provide a new, modified cationic binder system which exhibits good stability in dispersion, can be cured fully at lower temperatures (below 180°–190°) and is in particular suitable for cathodic electrocoating.

We have found that this object is achieved by providing an aqueous coating agent, impregnating agent and adhesive in which the binder is a mixture of (A) from 20 to 97% by weight of a cationic water-dispersible resin and (B) from 3 to 80% by weight of a hydrocarbon resin and/or a modified hydrocarbon resin, each of which per se is not water-dispersible.

The invention also relates to the use of this aqueous coating agent, impregnating agent and adhesive for cathodic electrocoating.

The mixtures of the invention can be cured at substantially lower temperatures than conventional cationic binders and offer special advantages in specific fields of use, e.g. electrocoating.

For cathodic electrocoating they offer, for example, improvements in respect of the following properties: they give a higher electrochemical deposition equivalent, require lower baking temperatures and have a broader baking range, have better throwing power, are less sensitive to water droplets, and offer better corrosion protection.

Furthermore, they exhibit less redispersion of the freshly deposited coating when the current is switched off.

The following may be noted in respect of the individual components of which the binder mixture of the invention is composed:

(A) suitable cationic water-dispersible resins (A), the manufacture of which is not an object of the present invention, are:
- copolymers of aminoalkyl ester salts of acrylic acid or methacrylic acid, as described, for example, in British Pat. No. 1,132,267, Netherlands Pat. No. 70/17,172, British Pat. No. 1,331,859, German Laid-Open Application DOS 2,325,117 and U.S. Pat. Nos. 3,883,483 and 3,853,803;
- copolymers of salts of vinylated heterocyclic compounds containing a basic nitrogen, as disclosed, for example, in British Pat. No. 1,139,837 and U.S. Pat. No. 3,853,803;
- copolymers of salts of polymerizable aminoalkylamides (cf., for example, British Pat. No. 1,159,812);
- salts of epoxy resin derivatives possessing basic groups, such as are described, for example, in Belgian Pat. No. 693,753; German Published Application DAS 1,814,072, U.S. Pat. No. 3,640,926, British Pat. No. 1,307,585, French Pat. No. 2,051,662, British Pat. No. 1,235,975, U.S. Pat. No. 3,719,626, German Laid-Open Applications DOS 2,033,770, DOS 2,003,123 and DOS 2,163,143, German Published Application DAS 2,237,114 and U.S. Pat. No. 3,925,180;
- salts of Mannich bases derived from phenols, such as are disclosed, for example, in German Published Application DAS 1,644,839 and British Pat. No. 1,302,328;
- solubilized polyamides (cf., for example, British Pat. No. 1,302,328);
- polymers with quaternary ammonium groups, such as are described, for example, in German Laid-Open Applications DOS 2,339,398, DOS 2,163,143 and DOS 2,237,114;
- polymers with sulfonium groups, such as are described, for example, in German Patent Applications P 25 57 562 and P 25 48 394, Netherlands Pat. No. 7,205,851, U.S. Pat. No. 2,166,214, German Laid-Open Application DOS 2,261,804, U.S. Pat. Nos. 3,873,488 and 3,793,278 and British Pat. No. 1,370,966;
- polymers with phosphonium groups (cf., for example, German Laid-Open Application DOS 2,261,804) and
- urethane polymers with ammonium groups, such as are disclosed in Japanese Patent Applications 8101-430 and 8101-431 and U.S. Pat. No. 3,891,527.

The cationic water-dispersible resins (A) can be cross-linked, or co-crosslinked, by heating. The cross-linking takes place via reactive groups contained in the resin molecule, e.g. hydroxyl, amide, N-methylolamide, N-methylolamide-ether, ester, epoxide or blocked isocyanate groups or reactive double bonds.

Instead of a particular cationic resin, mixture of cationic resins, e.g. of a resin possessing quaternary ammonium groups and a resin possessing ternary sulfonium groups, may be employed. The result is virtually the same whether the pH of the aqueous dispersions in which the resins are processed is acid, neutral or alkaline.

Suitable hydrocarbon and modified hydrocarbon resins which per se are not water-dispersible are those from the category of the polydiene resins.

Relatively short-chain polymers or mixtures of relatively short-chain polymers, which have a linear and/or cyclic structure and contain reactive double bonds distributed over the chain and in the terminal positions are particularly suitable. The hydrocarbon resins of the present invention may be dried or cured either oxidatively or by a temperature-dependent crosslinking polymerization reaction, by themselves or in combination with other unsaturated compounds or systems.

The mean molecular weight of the hydrocarbon resins to be used according to the invention is generally from about 300 to about 6,000. For most applications, a mean molecular weight of about 1,000 is advantageous. The acid number is generally at most 25, preferably at most 1 and the saponification number is generally at most 20, preferably at most 1. The iodine number is generally from about 100 to about 480. These hydrocarbon resins may be synthesized from butadiene, isoprene, cyclopentadiene or distillation cuts of unsaturated hydrocarbons, which may also contain aromatic components, e.g. styrene and/or indene, but preferably contain aliphatic unsaturated hydrocarbons.

The hydrocarbon resin content of the binder mixture is suitably from 3 to 80, preferably from 5 to 40, % by weight.

The binder mixtures of the invention are as a rule manufactured by starting from a concentrated solution of a basic resin in an organic solvent, into which the hydrocarbon resin is stirred. If the latter resin is of low molecular weight and low viscosity, the mixture can be prepared readily. If the hydrocarbon resin to be stirred in is of high molecular weight, it is best admixed, to the cationic resin, in the form of a solution in a water-miscible or water-insoluble solvent.

Another method of manufacture of the aqueous cationic binders is to introduce the hydrocarbon resin, if appropriate in the form of an organic solution, into the aqueous solution of the cationic resin and to stir the mixture (in a ball mill or simple stirred equipment) until a dispersion of the desired fineness has been produced.

Suitable counter-ions for the cationic resin are the radicals of inorganic or, preferably, organic acids, e.g. of acetic acid, propionic acid, butyric acid, formic acid, lactic acid and boric acid. The cationic binder may be completely or partially neutralized. In some cases, especially in the case of most binders containing basic nitrogen, adequate dispersibility is achieved even by mere neutralization with $CO_2$. In the majority of cases, especially in the case of starting resins containing basic nitrogen, equivalent neutralization is not needed in order to achieve a stable dispersion on dilution with water.

To facilitate dispersion, improve leveling and substrate wetting and improve pigment wettability and the like, the effect of the neutralizing agent can be assisted by the use of special solvents, plasticizers, autoxidation stabilizers, curing accelerators and other conventional assistants.

In addition, the aqueous dispersions may contain up to 40% of other binders, preferably low molecular weight compounds or oligomeric compounds which undergo a co-crosslinking reaction with the reactive groups of the cationic resin. Examples include amine-formaldehyde resins, e.g. melamine-formaldehyde and benzoguanamine-formaldehyde resins, phenol-formaldehyde resins, epoxy resins, blocked polyisocyanates, e.g. polyisocyanates which are blocked by CH-active, NH-active or OH-active compounds which can be split off at below 180° C., e.g. malonate esters, ε-caprolactam or oximes, such as methyl ethyl ketonoxime, and mixtures of these and other resins.

For various applications, especially for use as finishes, pigmenting of the binders is desirable. Pigments, e.g. titanium dioxide and carbon black, fillers, e.g. talc and china clay, dyes, curing catalysts, e.g. acids or compounds which eliminate acids, leveling agents, e.g. high-boiling organic solvents, and the like, may be incorporated either into the organic phase before dilution with water or into the diluted aqueous dispersion. The conventional milling or grinding equipment may be used, since the new cationic binders are stable to shear.

The preferred use of the binders of the invention is the cathodic electrocoating of electrically conductive surfaces, for example of metal articles, e.g. sheets of brass, copper, aluminum, iron and steel, which may have been chemically pretreated, e.g. phosphatized.

The solids content of the aqueous binders is in general from 35 to 75% by weight for conventional processing methods; where the binders are used as electrocoating finishes, the solids content of the aqueous finishes is as a rule from about 8 to 15% by weight. The temperature of the electrocoating finish should be from about 20° to 40° C. The deposition voltage, whether direct voltage or asymmetrical alternating voltage, is preferably from 100 to 450 V. The high breakdown strength and low residual current density of these binders and of the electrocoating finishes manufactured therefrom deserve particular mention. A further advantage is the low current required for deposition (the low electrical deposition equivalent in Coulomb/g).

The films deposited by electrocoating have an excellent insulating action, even whilst still wet and in the form of a relatively thin layer of about 20 μm, and exhibit a high electrical breakdown strength, which results in very good throwing power of the finish.

In the Examples, parts and percentages are by weight.

EXAMPLE 1

Cationic electrocoating finish using a water-dispersible resin (A) containing ammonium groups.

1a, Comparative finish (Finish 1): a cationic finish without hydrocarbon resin. A heat-curable condensation product based on bisphenol A, formaledehyde and a secondary amine which has been obtained under the conventional conditions of manufacuture of Mannich bases is partially neutralized with acetic acid and diuted with water to a solids content of 10% by weight. 1b, Finish 2: the condensation product from 1a is mixed in the weight ratio of 70:30 with a hydrocarbon oil which is based on a cationically polymerized $C_5$-cut and has a mean molecular weight of 300, an acid number of <1, a saponification number of <1 and an iodine number of 380; the mixture is partially neutralized with acetic acid as under 1a and diluted with water to a total solids content of 10% by weight.

1a, Finish 3: a 70:30 mixture is prepared similarly to 1b, using a hydrocarbon resin which is based on a cationically polymerized mixture of cyclopentadiene, isoprene, butadiene and other $C_5$-cut constituents and has a mean molecular weight of 430, an iodine number of 210, an acid number of <0.1 and a saponification number of <0.1. After partial neutralization as described under 1a, the material is diluted with water to a total solids content of 10% by weight.

The three finishes are deposited cathodically under identical conditions in a DC voltage deposition cell. The coating time is 2 minutes in each case, and the deposition voltages are shown in Table 1.

TABLE 1

| | | Finish 1 | Finish 2 | Finish 3 |
|---|---|---|---|---|
| I | Deposition equivalent | 56 Cb/g | 39 Cb/g | 34 Cb/g |
| II | Final current density at 250 V (m A/cm$^2$) | 0.36 | 0.32 | 0.26 |
| III | Deposition voltage for a film which is 23μm thick when dry (V) untreated iron sheet | 80 | 170 | 180 |
| | zinc-phosphatized iron sheet | 200 | 200 | 210 |
| | iron-phosphatized iron sheet | 200 | 200 | 210 |
| IV | Throwing power (depth of penetration in cm into a gap 2 mm wide) | 11.4 | 13.6 | 15.7 |

TABLE 1-continued

| | | Finish 1 | Finish 2 | Finish 3 |
|---|---|---|---|---|
| V | Required baking temperature to give an acetone-resistant finish) | 190° | 180° | 150° |

The finishes 2 and 3 based on the binder of the invention show the following advantages over the comparative finish 1:

A lower deposition equivalent and a lower final current density, which mean lower current consumption for depositing the finish (I and II).

Substantially less variation in deposition voltage, in the case of the new binders, between untreated iron sheet and phosphatized iron sheets (III).

Better throwing power of the new binders (IV).

A substantial lowering of the baking temperature, dependent on the hydrocarbon resin used.

EXAMPLE 2

Cathodic electrocoating using a binder based on a polymer containing sulfonium groups.

2a, Comparative finish (Finish 1): 135 parts of a 60% strength solution, in ethylglycol, of a sulfonium acetate based on a diglycidyl ether of molecular weight about 1,800, described for example in DOS 2,548,394 (=British Patent Application No. 44803/76), are mixed with 40 parts of a plasticized urea-formaldehyde resin in butanol (Plastopal BT from BASF) and the mixture is diluted with water to a total solids content of 10% by weight.

2b, Finish 2: Finish 2 consists of 70 parts of the binder described in 2a and 30 parts of the hydrocarbon resin described in Example 1b. 93.5 parts of the 60% strength sulfonium acetate solution (cf. 2a), 26 parts of a 50% strength solution of a urea resin (as described in 2a) and 30 parts of a water-insoluble hydrocarbon resin (mean molecular weight 400, Gardner-Holdt viscosity Z1-Z3, iodine number 180, acid number 0, saponification number 0) are mixed homogeneously and the mixture is diluted with water to a total solids content of 10% by weight.

The cathodic finishes are deposited onto zinc-phosphatized sheet iron slabs in an electrocoating installation, using a deposition voltage of 210 V, with a coating time of 2 minutes. Some results are compared in Table 2. It is found that the system according to the invention (Finish 2) gives greater hardness and greater solvent resistance even at a baking temperature which is lower by 10°. The throwing power and deposition equivalent are also more advantageous in the case of the finish according to the invention.

TABLE 2

| | Finish 1 | Finish 2 |
|---|---|---|
| baking temperature (duration 30 minutes) | 180° | 170° |
| throwing power (2 mm gap) in cm | 6.4 | 9.5 |
| deposition equivalent (Cb/g) | 39 | 30 |
| Konig pendulum hardness, sec. | 160 | 180 |
| acetone resistance | almost | resistant |

TABLE 2-continued

| | Finish 1 | Finish 2 |
|---|---|---|
| | | resistant |

EXAMPLE 3

40 parts of a heat-curable condensation product based on bisphenol A, formaldehyde and a secondary amine (cf. German Laid-Open Application DOS 2,320,301), 60 parts of a hydrocarbon oil based on a cationically polymerized C5-cut and 1 part of acetic acid were mixed and slowly stirred into 173 parts of water.

A stable dispersion is obtained.

0.6 part of the above dispersion is added to a paper fiber pulp of 12 parts of soda cellulose and 3,000 parts of water, and the mixture is converted in the conventional manner, at pH 7, to give a paper weighing 75 g/m². In a flotation test, this paper shows no water penetration after 2 weeks.

We claim:

1. An aqueous coating agent for the cathodic electrocoating of electrically conductive surfaces in which the binder is a mixture of
   (A) from 20 to 97% by weight of a cationic water-dispersible resin and
   (B) From 3 to 80% by weight of a polydiene resin which per se is not water-dispersible.

2. An aqueous coating agent for the cathodic electrocoating of electrically conductive surfaces, as claimed in claim 1, in which component (B) has a mean molecular weight of from about 300 to about 6,000.

3. An aqueous coating agent for the cathodic electrocoating of electrically conductive surfaces as claimed in claim 1, in which component (B) has an iodine number of from about 100 to about 480.

4. An aqueous coating agent, for the cathodic electrocoating of electrically conductive surfaces as claimed in claim 1, in which the binder contains from 5 to 40 percent by weight of component (B).

5. An aqueous coating agent for the cathodic electrocoating of electrically conductive surfaces as claimed in claim 1, in which the binder has a solids content of from 35 to 75% by weight.

6. An aqueous coating agent for the cathodic electrocoating of electrically conductive surfaces as claimed in claim 1, in which the solids content is from about 8 to 15% by weight.

7. An aqueous coating agent for the cathodic electrocoating of electrically conductive surfaces as claimed in claim 1, in which component (B) has an acid number of less than 25 and s saponification number of less than 20.

8. An aqueous coating agent for the cathodic electrocoating of electrically conductive surfaces as claimed in claim 1, to which has been added up to 40% by weight, based on the binder mixture (A)+(B), of a crosslinkable resin from the group comprising amine-formaldehyde resins, phenol-formaldehyde resins and blocked polyisocyanates.

9. An aqueous coating agent for the cathodic electrocoating of electrically conductive surfaces as set forth in claim 1, in which component (A) is salts, of Mannich bases derived from phenols.

* * * * *